July 16, 1946.    T. A. KEEN    2,404,074
ANNUNCIATOR SYSTEM
Filed Feb. 29, 1944    5 Sheets-Sheet 1
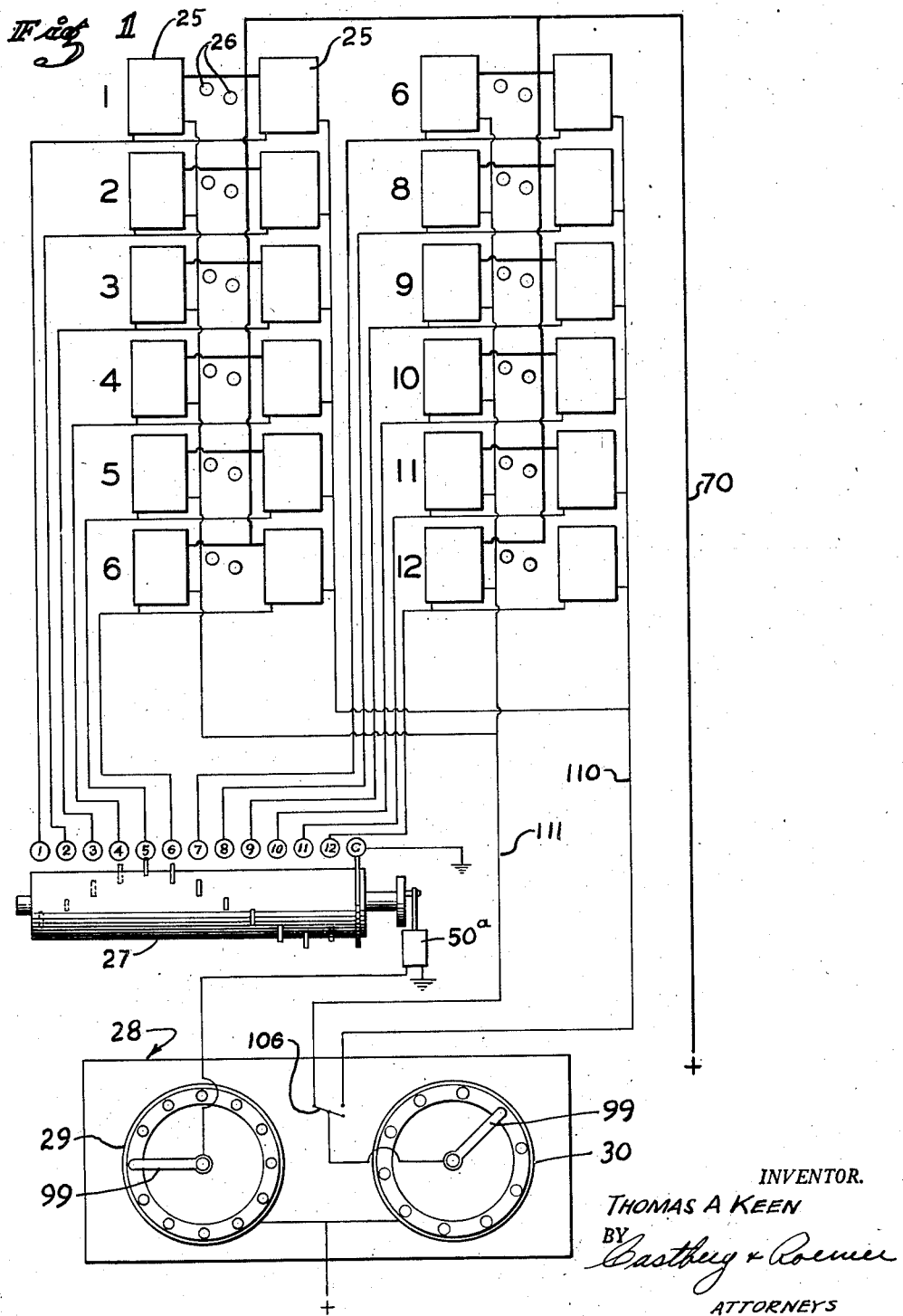
INVENTOR.
THOMAS A KEEN
BY
ATTORNEYS July 16, 1946.  T. A. KEEN  2,404,074
ANNUNCIATOR SYSTEM
Filed Feb. 29, 1944  5 Sheets-Sheet 2
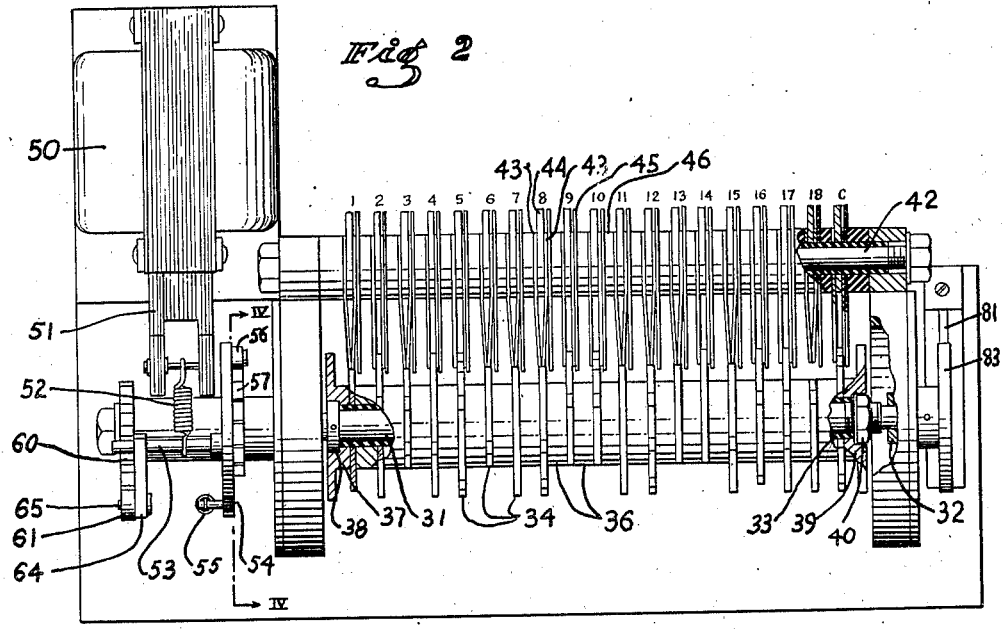
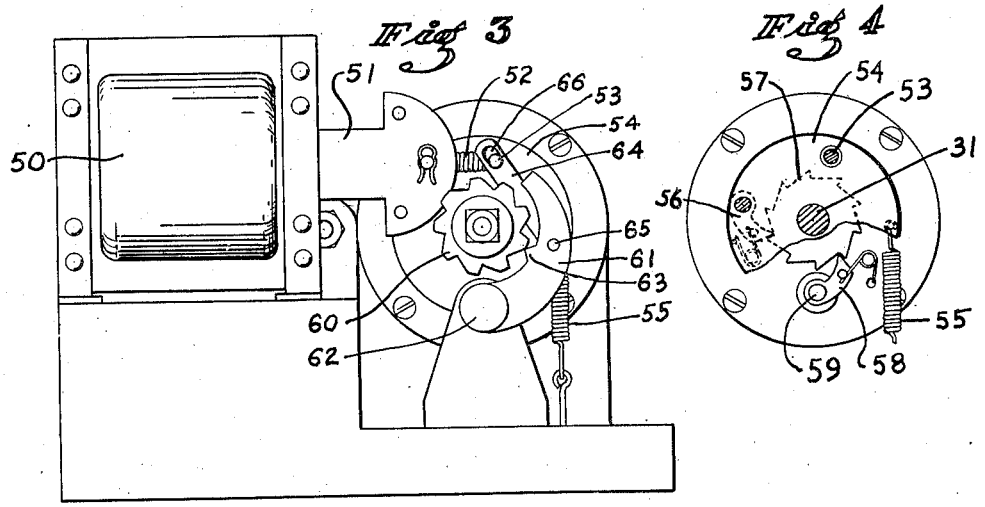
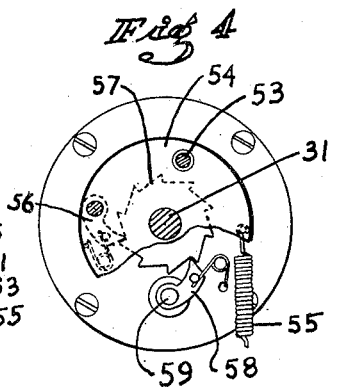
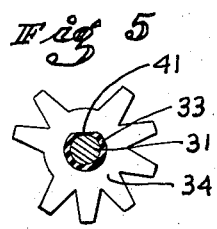
INVENTOR.
THOMAS A KEEN
BY Castberg & Roemer
ATTORNEYS INVENTOR.
THOMAS A KEEN
BY Ostberg & Roemer
ATTORNEYS July 16, 1946.　　　　T. A. KEEN　　　　2,404,074
ANNUNCIATOR SYSTEM
Filed Feb. 29, 1944　　　5 Sheets-Sheet 4
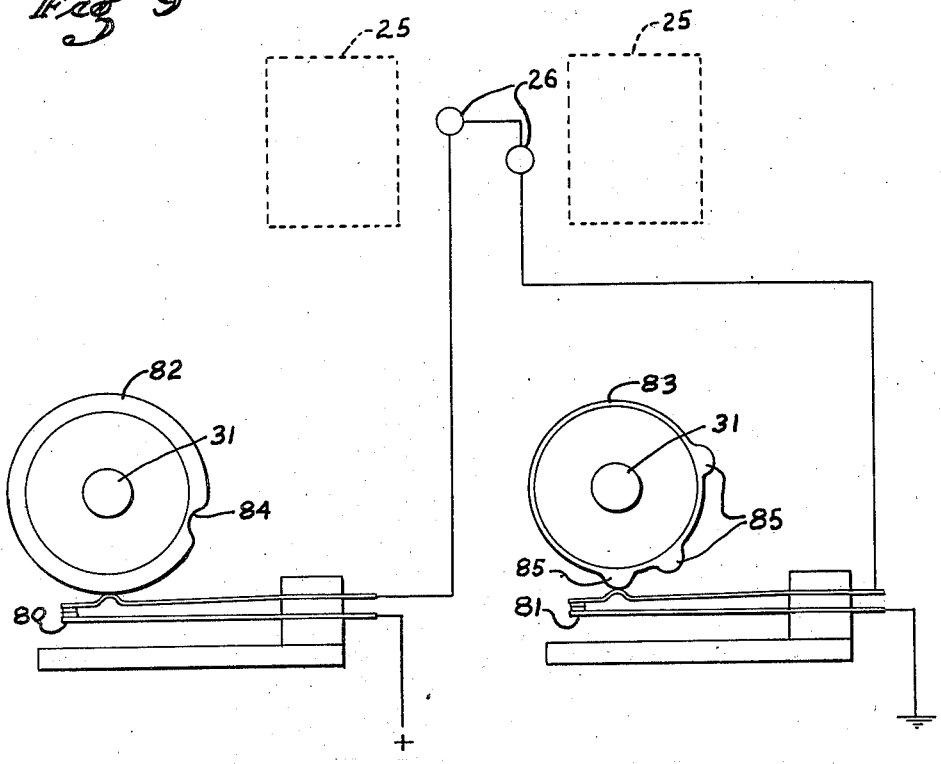
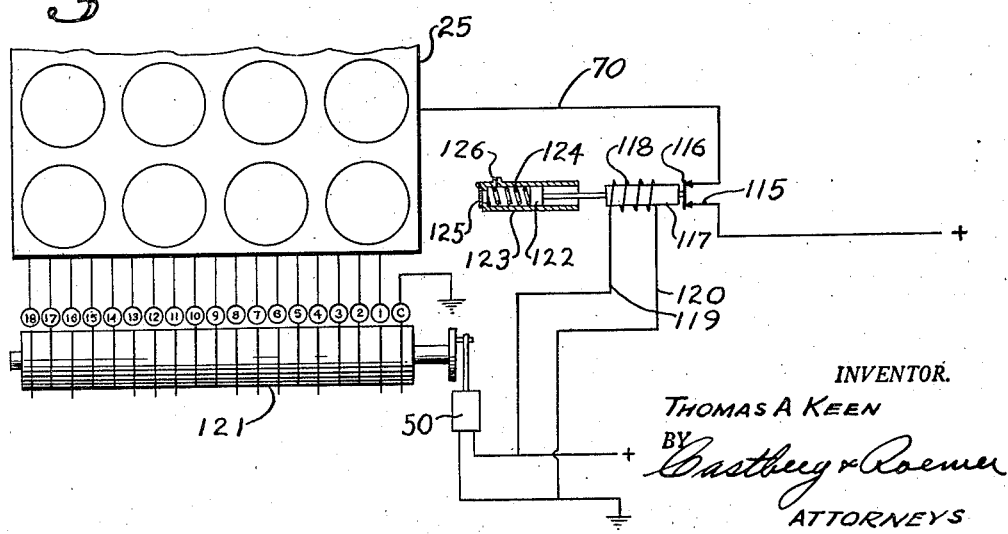
INVENTOR.
THOMAS A KEEN
ATTORNEYS July 16, 1946.    T. A. KEEN    2,404,074
ANNUNCIATOR SYSTEM
Filed Feb. 29, 1944    5 Sheets-Sheet 5
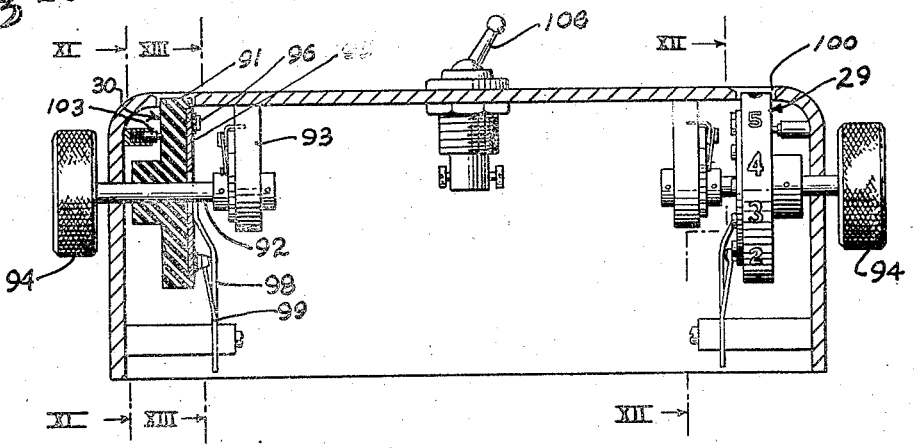
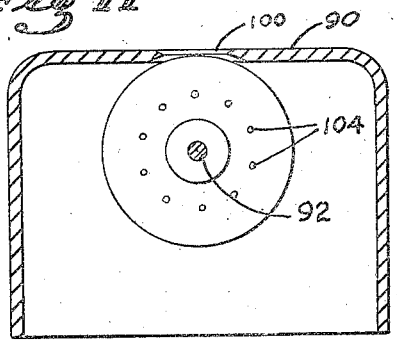
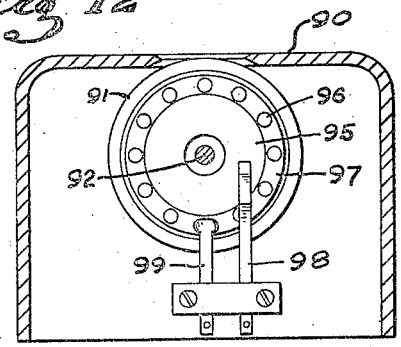
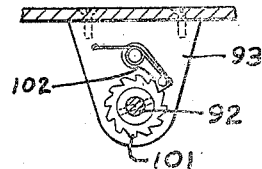
INVENTOR.
THOMAS A KEEN
BY Castberg & Roemer
ATTORNEYS Patented July 16, 1946

2,404,074

UNITED STATES PATENT OFFICE 2,404,074

ANNUNCIATOR SYSTEM

Thomas A. Keen, San Mateo, Calif., assignor of one-half to Hannah M. Smith, Chicago, Ill.

Application February 29, 1944, Serial No. 524,493

3 Claims. (Cl. 177—337)

This invention relates to an annunciator system and particularly to controls for electric annunciating systems by means of which large annunciator boards displaying many characters delineated by electric lamps may be controlled from a distant station with a minimum of electric wiring.

While the invention herein described has many useful applications, it is particularly adaptable to use in connection with the "odds" board or annunciator commonly used at horse races to display to the public the value of bets being placed on each horse as compared with the total sum wagered or, in other words, to post the betting odds. The invention is therefore described herein in that particular application for purposes of illustration but without intent to limit its scope to the example given.

It is the usual practice at racetracks to display the odds which apply to the various entries in the race as the betting on the race progresses. The odds are constantly changing on the entries and are displayed in electrically illuminated numerals. These numerals are made up of banks of electric lamps which may be selectively lighted in groups representing Arabic numerals. The formation of Arabic numerals by selective lighting of lamps in a bank is well known and may be accomplished in several manners, one of which is illustrated and described in detail in Patent No. 2,203,630 for Annunciator issued to me on June 4, 1940.

The average odds board has two banks of lamps in order to present two numerals for each of twelve entries. There are often several of these odds boards at different locations at a single track and they are preferably controlled from a central location remote from the boards.

It is the object of the present invention to provide an annunciator system in which the lamps on the annunciator board may be controlled from a distant station with a minimum of wires communicating between the board and the station, and to provide a multiple circuit switch to be used in combination with other switches in such a manner that any one of numerous entries may be selected and the particular numerals representing the odds on said entry may be illuminated all through very simple control mechanism.

A further object of this invention is to provide in combination with multiple circuit switches which control the illumination of numerals in two banks of lamps a means for illuminating a dash or other character between the two banks automatically upon the illumination of certain combination of numerals therein.

Further objects and advantages of the invention will be set forth and made apparent in the following description which, with reference to the accompanying drawings, illustrates a typical embodiment of the invention.

In the drawings:

Fig. 1 is a diagrammatic illustration of an annunciator system embodying the present invention and showing an odds board, a rotary switch for selecting a circuit to any one of the entries represented on said board, and a set of main control switches;

Fig. 2 is a plan view, parts being shown in section of a rotary multiple circuit switch;

Fig. 3 is an end elevation of the switch shown in Fig. 2;

Fig. 4 is a sectional view taken on line IV—IV of Fig. 2;

Fig. 5 is a detail view of one contact member used in the switch shown in Fig. 2;

Fig. 9 is a wiring diagram illustrating the method of automatically illuminating a lamp switch constituting a dash between certain digits displayed on the odds board;

Fig. 10 is a central vertical section of a control switch housing;

Fig. 11 is a sectional view taken on line XI—XI of Fig. 10;

Fig. 12 is a section taken on line XII—XII of Fig. 10;

Fig. 13 is a fragmentary section taken on line XIII—XIII of Fig. 10; and

Fig. 14 is a diagrammatic view illustrating the application of time delay relays to the lamp circuits.

Figure 6:
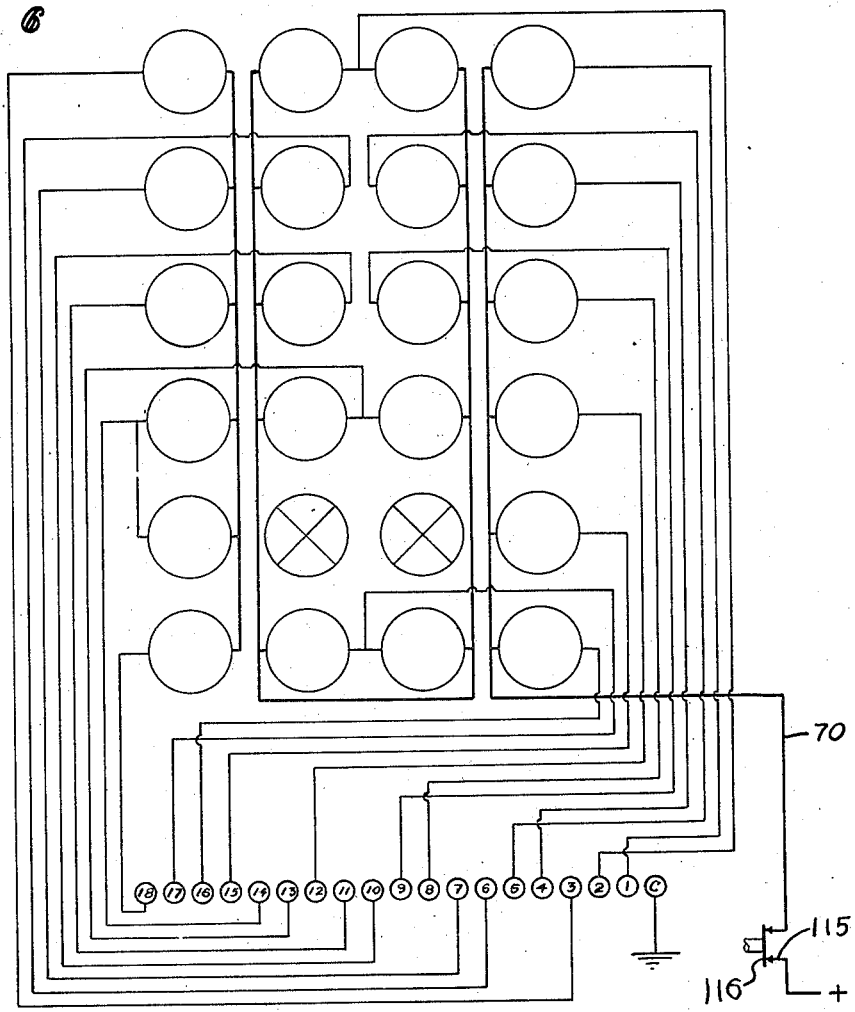
Fig. 6 is a diagrammatic view showing a bank of lamps constituting one unit of an odds board and illustrating the circuits through said lamps and through a multiple circuit switch such as that shown in Fig. 2.

Referring to Fig. 1, a typical odds board is illustrated as comprising 12 pairs of light units or banks of lamps, each capable upon selective lighting of displaying any numeral from 0 to 9. These pairs of light units are numbered 1 to 12 to designate the entry in a race to which each pair applies. Each unit comprises a rectangular housing 25 containing, as will hereinafter be explained in further detail, a bank of twenty-two electric lamps. Interposed between the units of each pair are two lamps shown at 26 arranged to represent a dash or hyphen separating the numerals displayed with the units desired.

Adjacent to and preferably within the housing which contains each bank of lamps is a multiple circuit switch operable to select circuits to various groups of lamps necessary to display any desired digit. Apart from the housings is a single rotary selector switch indicated at 27 which is operable to select a circuit which includes any pair of the units or, expressed otherwise, to select an entry upon which odds are to be posted. When this entry has been selected, the multiple circuit switch within each separate unit may be operated to display the numerals which represent the odds for that particular entry. All of this mechanism is disposed at the side of the odds board but is operated through remotely positioned control switches generally indicated at 28 and consisting principally of an entry selector switch 29 and an odds selector switch 30. As a consequence of this arrangement, the individual circuits to several hundreds of lamps are controlled from a remote station through very few electric wires, thus obviating the necessity of carrying hundreds of wires all of the way across a race track and for distances which often times exceeds a quarter of a mile.

The construction of the rotary switch 27 and the multiple circuit switches disposed within the units are substantially similar and a typical switch is illustrated in Figs. 2 to 5 inclusive. Referring first to Fig. 2, a rotatable cylinder is shown as supported upon a shaft 31 journaled at its opposite ends in bearings, one of which is shown at 32. A sleeve 33 of dielectric material is carried by the shaft and extends substantially throughout its entire length. Multiple point contact members 34, a typical one of which is illustrated in Fig. 5, are spaced along the shaft between spacers 36. A retaining member 37 is held at one end of the shaft by a collar 38 and a similar retaining member 39 at the opposite end is urged inwardly by a nut 40 so that the contact members 34 and the spacers 36 are all securely clamped in position. The members 34 are also preferably additionally held against rotation on the shaft by being splined or otherwise keyed to the shaft or dielectric tube 33 as by the flat side indicated at 41 in Fig. 5.

A rod 42 disposed parallel to the shaft 31 supports a group of spring contacts in alignment with the several contact members 34, each of these spring contacts being made up of a pair of resilient fingers 43 separated by a spacer 44 to which a conductor may be soldered or otherwise secured and an insulating leaf 45 of dielectric material. These contacts are spaced by dielectric spacers 46 so that they are positioned to receive the radially extending points of the contacts 34 between their resilient members 43. A common contact member 34 is provided at the right hand end of the cylinder and this contact member is identical to the one shown in Fig. 5 except that it has ten equally spaced radial projections so that it engages the fingers 43 upon each tenth cycle movement of the cylinder. The remaining eighteen contact members 34 have various numbers of contact points so arranged that upon each tenth cycle movement of the cylinder only predetermined circuits are completed through the resilient members 43 in groups which effect the illumination of selected lamps in a unit to present various numerals.

The mechanism for imparting rotation in tenth cycle increments to the contact cylinder is shown in Figs. 2, 3 and 4. In Figs. 2 and 3 a solenoid 50 is shown as having an armature 51 which is retracted upon energization of the solenoid and which is connected through a resilient link or spring 52 with a pin 53 carried by and projecting from a disc 54 rotatably mounted upon the shaft 31. Energization of the solenoid therefore rotates the disc 54 a short distance against the tension of a spring 55. The disc 54 carries a spring pressed pawl 56 which engages a ten-toothed ratchet 57 fixed to the shaft 31 whereby the shaft is advanced through one-tenth of a cycle. A similar pawl 58 (see Fig. 4) on a fixed pivot 59 engages the ratchet to prevent reverse rotation thereof when the solenoid is de-energized and the spring 55 returns the disc 54 to normal.

A detent mechanism is provided to prevent the shaft from rotating more than one-tenth of a cycle upon each energization of the solenoid. This mechanism, as shown in Figs. 2 and 3, comprises a notched wheel 60 fixed to the shaft and a lever 61 pivoted at 62 and provided with a projection 63 adapted to enter the notches of the wheel 60. A link 64 forms a connection between this lever through a pin 65 and the pin 53 to which the link is connected by an elongated slot 66 in its upper end. Upon each retraction of the armature 51 the lever 61 is therefore drawn toward the shaft causing the projection 63 to enter one of the ten equally spaced notches in the wheel 60 temporarily to lock the shaft in its proper position.

Figure 7:
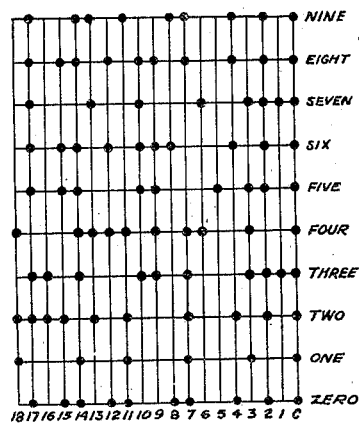
Fig. 7 is a diagram illustrating the positions of contacts on the switch shown in Fig. 2.
Figure 8:
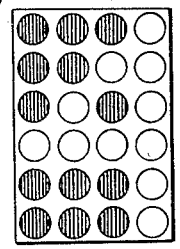
Fig. 8 is a front elevation of a bank of lamps with certain lamps illuminated to display an Arabic numeral.

The manner in which the step by step rotation of the switch mechanism effects selective illumination of lamps to display various numerals is illustrated in Figs. 6, 7 and 8, where the circuits connecting the switch with the lamp bank are diagrammatically shown. Fig. 6 illustrates a lamp bank viewed from the rear and shows an arrangement of twenty-four spaces, twenty-two of which contain lamps. The two blank spaces, indicated in the drawing by cross lines, are those which do not enter into the formation of any Arabic numeral. Each of the spaces which contains a lamp is connected in a circuit which includes a common wire 70 and a second wire which leads from the lamp through one of the contacts 1 to 18 which represent the resilient contact members on the switch illustrated in Fig. 2. Exceptions to this are present in the cases of the contact members 2, 13, 14 and 17, each of which is in circuit with two lamps of the bank effecting a reduction in the necessary number of contacts by reason of the fact that these several combinations of two lamps are used together whenever either one of them is used in the formation of a numeral. The combinations of lamps lighted to produce the various numerals are clearly disclosed in my Patent No. 2,203,630, hereinbefore referred to and a further detailed discussion of the same is unnecessary for an understanding of the present invention. However, the manner in which the lamps are selectively lighted is disclosed in Fig. 7 wherein the contacts which are established upon step by step rotation of the switch are diagrammatically shown. In this figure, each of the vertical lines represents one of the contact members shown in Fig. 5 while the horizontal lines represent the ten positions of those members and the dots at the intersections of the lines represent the particular circuits that are completed in each of the several positions. For example, in position four, contact members 3, 6, 7, 9, 11, 12, 13, 14 and 18, together with the common contact member, all complete their circuits so that the lights delineating the numeral 4 are lighted to present the effect illustrated in Fig. 8. By following the circuits including these contact members in Fig. 6, it is apparent that the electrical energy entering the lamp bank through the wire 70 passes through the selected lamps then back through the contacts enumerated and through the common contact C to ground.

A discussion of the customary way of displaying odds is necessary to an understanding of the manner in which certain results are automatically accomplished by the present invention. In each pair of units or lamp banks, the right hand unit represents digits and the left hand unit represents tens. Therefore, when the numeral 1 is illuminated in the right hand bank, the odds are 1 to 1 or even money. The numeral 2 is illuminated for the odds 2 to 1, 3 for 3 to 1, and so on up to 9 to 1, 10 to 1 odds are represented by a 1 in the tens bank and a 0 in the digit bank, and this order is followed upwardly as high as the odds may go. It is apparent that a 0 is at all tmes unnecessary in the tens bank and the mechanism for eliminating the 0 in this bank is presently to be described. It is desirable also to display the following odds:

| 1 to 2 | 2 to 3 | 3 to 2 | 4 to 3 | 5 to 2 | 6 to 5 |
|---|---|---|---|---|---|
| 1 to 3 | 2 to 5 | 3 to 5 | 4 to 5 | 5 to 3 | |
| 1 to 5 | | | | | |
| | | 7 to 2 | 8 to 3 | 9 to 2 | |
| | | 7 to 3 | 8 to 5 | 9 to 3 | |
| | | 7 to 5 | | 9 to 5 | |

Any one of the odds above enumerated could be mistaken for an entirely different odds except that they are displayed with a dash between the tens order and the digits order, thus 12 would indicate odds at 12 to 1, whereas 1-2 indicates odds of 1 to 2. In practice, every 2 digit number ending in 2, 3 or 5 will be presented with a dash so that the odds of 12 to 1, 13 to 1 and 15 to 1 cannot be displayed. The failure to display such odds is, however, immaterial as it is understood that the odds displayed are merely an approximation and when they have reached the proportions of 12 or 13 to 1 the odds of 11 to 1 or 14 to 1 may be substituted as approximate odds, the actual odds being finally determined only after the betting has closed, at which time it is unnecessary to display the odds on the board.

The illumination of the dash in all combinations ending in 2, 3 and 5, is accomplished by mechanism best illustrated in Fig. 9. In this figure a pair of switches 80 and 81 are illustrated as controlled by rotary cams 82 and 83, respectively. These cams are mounted on the shafts 31 on the rotary multiple circuit switches illustrated in Fig. 2, the cam 83 being shown at the right hand end of the shaft in this figure. The switch 80 is mounted on the multiple circuit switch which controls the tens bank and the switch 81 is mounted on the switch which controls the unit bank and both of the switches 80 and 81 are as shown in Fig. 9 connected in series in a circuit which includes the lamps 26 which form the dash between the units 25. The cam 82 normally holds the switch 80 closed but has a depression 84 in its profile which permits the switch to open when the shaft 31 is in its 0 position. The cam 83 normally permits the switch 81 to remain open but has three projections 85 on its profile arranged at positions 2, 3 and 5 of the shaft 31 so that the switch is closed in the position of the shaft which illuminates the numerals 2, 3 and 5 in the digits bank. Consequently, when the tens order presents any of the numerals 1 to 9, inclusive, and the digits order presents any of the numerals 2, 3 or 5, both of the switches 80 and 81 are closed and a circuit is completed which illuminates the dash formed by the lamps 26. This includes all the combinations of odds listed above wherein the dash is necessary.

The rotary switch shown at 27 in Fig. 1, as was previously stated, is similar in construction and operation to the switch illustrated in Fig. 2 with the exception that it is advanced in steps of one-twelfth cycle each and its contact members of the type illustrated in Fig. 5 are 12 in number and each has a single projection, which projections are arranged progressively about the periphery of the shaft to occupy the positions illustrated in Fig. 1, wherein the number 5 contact is shown as closed. Thus upon energization of the solenoid 50a of this switch, the closed contact is advanced one step at a time in numerical order, the common contact always remaining closed. Thus with number 5 contact closed, as illustrated in Fig. 1, a circuit is completed which includes the number 5 lamp banks or more specifically which includes the common or ground contact of each of the multiple circuit switches included with said banks and which communicates through those switches and the lamps of the banks to the wire 70 of each bank which is illustrated in Fig. 6. Therefore, in order to illuminate numerals in any pair of lamp banks on the odds board the rotary switch 27 is first brought to a position which closes the circuit to the selected pair. The multiple circuit switches in said pair are then rotated to illuminate the numeral desired in each bank in the manner described.

The rotary switch 27, as well as the multiple circuit switches in the lamp banks are controlled from a remote position through the switch box illustrated in Figs. 10 to 13 inclusive.

In these figures a switch housing 90 is shown as enclosing an entry selector switch generally indicated at 29 and an odds selector switch generally indicated at 30. Each of these switches comprises a dielectric disc 91 mounted on a rotatable shaft 92 journalled at one end in a bearing bracket 93 and having at its other end and positioned exteriorly of the housing a knurled knob 94 by means of which it may be rotated. The disc 91 carries a metal plate 95 on its face and contact members 96 (see also Fig. 12) project from this disc through a dielectric ring 97. There are twelve equally spaced contact members 96 on the entry selector switch 29 and ten such members on the odds selector switch 30. A pair of contact fingers 98 and 99 are positioned so that the finger 98 engages and forms a continuous contact with the disc 95, while the finger 99 is positioned to engage the contact members 96 upon rotation of the switch. The outer periphery of the dielectric disc 91 is numbered from 1 to 12 in the case of switch 29 as indicated at the right hand side of Fig. 10 and similar numbers from 0 to 9 are provided on the outer periphery of the odds switch 30. These numbers are visible through sight openings 100 appropriately positioned in the top of the housing 90. A ratchet mechanism is provided to prevent reverse rotation of either of the switches and comprises, as shown in Fig. 13, a ratchet wheel 101 mounted on the shaft 92 and a spring pressed pawl 102 carried by the bearing bracket 93. A detent mechanism cooperates with each of the switches to facilitate stopping the rotation of the switch exactly at the point where the contact finger 99 rests on one of the contacts 96. This detent mechanism comprises a spring pressed plunger, as shown at 103 in Fig. 10, which bears against the back of the dielectric disc 91 and enters indentations 104 as shown in Fig. 11, the number and spacing of which agrees with the number of contacts 96 on the opposite face of the disc. A double throw switch 106 which is also diagrammatically illustrated in Fig. 1 is positioned centrally of the top of the housing 90.

The purpose of the switches 29 and 30 is to close the circuit or in other words, to send electric impulses to the solenoids which control the rotary switch 27 and the multiple circuit switches in the lamp banks. As the peripheries of the switch discs are numbered, an operator is informed upon any rotation or partial rotation just how many impulses have been sent.

The sequence of operation necessary to select an entry and to display any desired numerals on the odds board for the entry selected are as follows:

The entry selector switch 29 is rotated forwardly to bring it to the position of the number of the entry upon which the odds are to be displayed. Upon rotation each contact with the finger 99 completes a circuit through the solenoid 50a of the switch 27 so that the switch position is advanced to complete a circuit which may be traced in Fig. 1 through the wire 70 through both of the lamp banks of the entry selected and through the corresponding contact on the switch 27, then through the common contact of the same switch to ground. The proper entry having thus been selected, the double throw switch 106 may be positioned to complete a circuit either through the wire 110 which communicates with the digit lamp banks or the wire 111 which communicates with the tens lamp banks. Rotation of the odds selector switch then effects the sending of impulses to the solenoid of the multiple circuit switch which controls the display of numerals in the digit order and after the proper numeral is there displayed, the position of the switch 106 is reversed and the odds selector switch again manipulated to display the desired numeral in the other of the two lamp banks.

As the odds selector switch 30 is being adjusted to change the number displayed, it is often necessary that it be moved through other numbers not intended to be displayed. For example, in changing the number display from 1 to 4, the switch must be passed through its 2 position and its 3 position with the result that the numerals 2 and 3 would be unnecessarily illuminated. To avoid this, time delay relays are used as shown in Figs. 6 and 14. In Fig. 14 a delay relay switch 115 is shown as interposed in the conductor 70 of the lighting circuit to one of the lamp banks 25. Such a switch is interposed in the circuit to each lamp bank, and is controlled by the circuit which energizes the solenoid 50 which actuates the multiple circuit switch controlling the lamps in the bank. For example, as shown in Fig. 14, the switch comprises a contact bridging member 116 carried by an armature 117 of an electromagnet including a winding 118. The winding 118 is energized through wires 119 and 120 which are connected with the circuit to the solenoid 50 of the multiple circuit selector switch diagrammatically shown at 121. This switch 121 is the same as that illustrated in detail in Fig. 2 for selectively lighting the lamps in each bank to form the desired numerals. Each time the solenoid 50 is actuated to change a numeral appearing in a lamp bank, the winding 118 is also energized to retract the armature 117 and open the switch 115 in the circuit which energizes the lamp. The armature 117 carries a piston 122 which reciprocates in a cylinder 123. As the switcth opens the piston moves into the cylinder compressing a spring 124 therein. The air in the cylinder escapes through a check valve 125 at its end. As the energization of the solenoid circuit is but momentary, the piston is urged to its original position by the spring 124 to close the switch. However, the check valve 125 prevents admission of air to the cylinder and the speed of the return stroke is governed by the entrance of air through a bleeder port at 126. With the bleeder port arranged to effect a delay of just a second or two in the closing of the switch 115, all of the lamps in the lamp bank 25 will be de-energized upon the first impulse sent to the solenoid 50 of the multiple circuit selector and will remain so until a desired selection has been made whereupon the closing of the delayed action switch 115 will effect display of the selected numeral without other numerals having been flashed on the odds board during the making of the selection.

With the arrangement herein shown, only four wires are necessary for communication between the control station and the odds board. All of the electrical equipment in the odds board may therefore be arranged to make it portable so that it may easily be moved from one race track to another and the four single wires connecting it with the control station may be either left in place or removed and transported to another track at very low cost. The invention has been described herein in connection with a single odds board. Only conventional circuits are necessary, however, to control any number of odds boards simultaneously with the same control switches and in large race tracks where several odds boards are used, it is intended that they all be controlled simultaneously by the same method of control herein disclosed.

Having thus described my invention, what I claim and desire to secure by Letters Patent is—

1. In an annunciator system or the like having lamp banks arranged in pairs, a multiple circuit switch associated with each lamp bank for selectively lighting the lamps therein to present numerals from zero to nine, lamps representing a dash between each pair of banks, and means for lighting said dash automatically when certain combinations of numbers appear in the banks with which it is associated.

2. In an annunciator system or the like having lamp banks arranged in pairs, a multiple circuit switch associated with each lamp bank for selectively lighting the lamps therein to present numerals from zero to nine, lamps representing a dash between each pair of banks, and means controlled by the multiple circuit switches for lighting said dash when they are in position to present certain combinations of numbers in the lamp banks.

3. In an annunciator system having a pair of lamp banks and means for selectively lighting the lamps therein to present a numeral in each bank, lamps representing a dash between the numerals presented and means for lighting said dash automatically upon the presentation of certain combinations of numerals in the banks.

THOS. A. KEEN.